United States Patent
Akhoury et al.

(10) Patent No.: US 11,570,225 B1
(45) Date of Patent: Jan. 31, 2023

(54) DETECTION OF SIGNALS IN A VIRTUAL MEETING

(71) Applicant: CITRIX SYSTEMS, INC., Fort Lauderdale, FL (US)

(72) Inventors: Arnav Akhoury, Jamshedpur (IN); Satish Vanahalli, Bangalore (IN); Divyansh Deora, Jaipur (IN); Nandikotkur Achyuth, Hyderabad (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/398,626

(22) Filed: Aug. 10, 2021

(51) Int. Cl.
*H04L 65/611* (2022.01)
*H04L 69/40* (2022.01)
*H04L 69/24* (2022.01)
*H04L 65/1069* (2022.01)
*H04L 65/75* (2022.01)

(52) U.S. Cl.
CPC ........ *H04L 65/611* (2022.05); *H04L 65/1069* (2013.01); *H04L 65/762* (2022.05); *H04L 69/24* (2013.01); *H04L 69/40* (2013.01)

(58) Field of Classification Search
CPC . H04L 65/611; H04L 65/762; H04L 65/1069; H04L 69/24; H04L 69/40; H04L 29/08; H04L 67/1097; H04L 67/14; G06F 15/16; G06F 3/0604

USPC ......................................................... 709/203
See application file for complete search history.

(56) References Cited

U.S. PATENT DOCUMENTS

| | | | |
|---|---|---|---|
| 10,049,078 B1 * | 8/2018 | Volpe .................... | G06F 15/167 |
| 2017/0206106 A1 * | 7/2017 | Twitchell, Jr. ........ | G06F 3/0604 |

* cited by examiner

*Primary Examiner* — Glenford J Madamba (57) ABSTRACT

A method, a system, and a computer program product for determining whether signals are received by one or more devices in a virtual meeting. The method includes transmitting a data stream received from one or more host computing devices to one or more user computing devices in a plurality of user computing devices. The host and user computing devices are communicatively coupled using a real-time online connection. A first hash in a plurality of hashes is generated by the server using a portion of the data stream and stored in a memory location. The first hash is compared to a second hash received from the user computing devices. The second hash is generated by the user computing devices upon receipt of the transmitted data stream. Based on the comparison, a status of the real-time online connection between the host computing devices and the user computing devices is determined.

16 Claims, 9 Drawing Sheets

DETECTION OF SIGNALS IN A VIRTUAL MEETING

BACKGROUND

As a large population of employees switched to working remotely, a greater number of online meetings and online video conferences are being conducted each day. Periodically, during such online meetings and conferences, audio and/or video connection among their participants or attendees may be interrupted for various reasons, e.g., hardware/software malfunction, internet connection, hardware/software configuration, etc. This leaves attendees asking each other "Can you hear me?", "Is my screen visible?", "Let me know if you can hear me fine . . . ", "Can you see my screen?", "Am I audible?", "Please confirm if you can hear me fine and see the screen that I am sharing?", etc. To ensure that the online meetings are conducted in an uninterrupted fashion, it is important to determine whether any data (e.g., audio, video, etc.) that may be shared among attendees are actually being received and/or displayed/heard by others.

SUMMARY

In some implementations, the current subject matter relates to a method for determining whether signals are received by one or more devices in a virtual meeting. The method may include transmitting a data stream received from one or more host computing devices to one or more user computing devices in a plurality of user computing devices. The host computing devices and the user computing devices may be communicatively coupled using a real-time online connection (e.g., a virtual online meeting). A first hash in a plurality of hashes may be generated by the server using at least a portion of the data stream. The first hash may be stored in a memory location of the server. The first hash may be compared to a second hash received from one or more user computing devices. The second hash may be generated by the user computing devices upon receipt of the transmitted data stream. Based on the comparison, a status of the real-time online connection between the host computing devices and the user computing devices may be determined.

In some implementations, the current subject matter can include one or more of the following optional features. The method may further include displaying, at a user interface of the one or more host computing devices, an indication of the status of the real-time online connection. The indication of the status of the real-time online connection may include at least one of the following: the host computing devices are communicatively coupled to the user devices, the user computing devices are unable to receive the transmitted data stream, the data stream is not being transmitted from the host device, and any combination thereof.

In some implementations, the data stream may include at least one of the following: a video data, an audio data, a text data, a graphics data, and any combination thereof.

In some implementations, transmission of the data stream may include determining whether the data stream was received from the one or more host computing devices. Upon failing to detect a receipt of the data stream from the host computing devices, the server may generate and transmit to the host computing devices, a message indicating failure to receive the data stream from the one or more host computing devices. The message may be displayed at a user interface of the host computing devices. Upon receiving the data stream from the host computing devices, the server may transmit the data stream to the user computing devices.

In some implementations, the comparison of hashes may include determining whether the second hash was received from the user computing devices. Upon failing to detect a receipt of the second hash from the user computing devices, the server may generate and transmit to the host computing devices, a message indicating failure by the user computing devices to receive the data stream from the host computing devices. The message may be displayed at a user interface of the host computing devices. Upon receiving the second hash from the user computing devices, the server may perform the comparing of the hashes.

In some implementations, the server may generate and store a plurality of first hashes and compare them to a plurality of corresponding received second hashes. The status of the real-time online connection may be determined based on a number of first hashes in the plurality of first hashes matching a number of second hashes in the plurality of second hashes.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to detect receipt of signals in a virtual meeting, and in particular, to determine whether data (e.g., video, audio, text, etc.) being shared by attendees during an online conference is received by the attendees.

Figure 1:
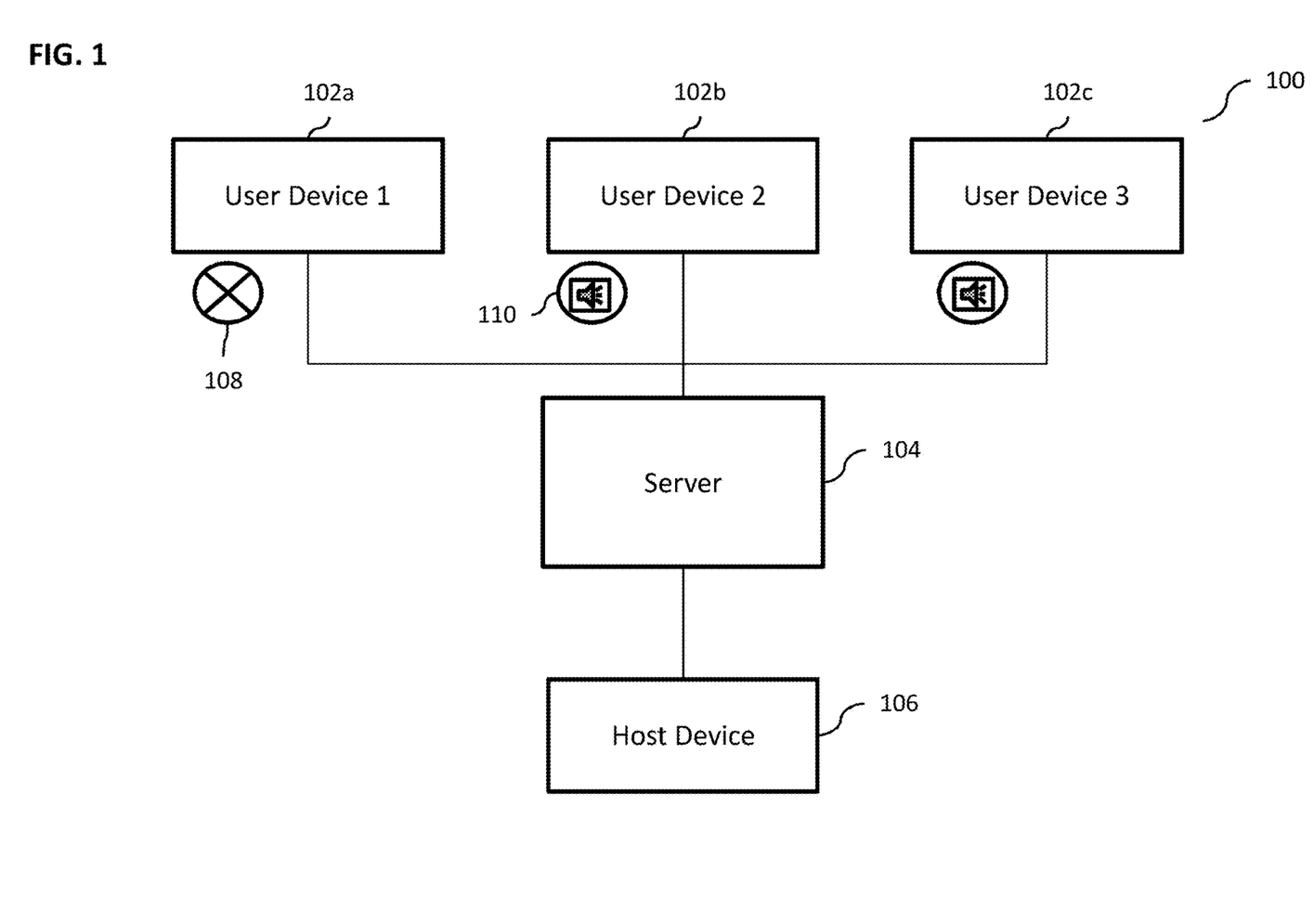
FIG. 1 illustrates an example of a system for detection of receipt of signals in a virtual meeting, according to some implementations of the current subject matter.

FIG. 1 illustrates an example of a system 100 for detection of receipt of signals in a virtual meeting, according to some implementations of the current subject matter. The signals may represent a video file/signal, an audio file/signal, an image file/signal, a graphics file/signal, a text data, and/or any other data file that may or may not include a video file/signal, an audio file/signal, an image file/signal, a graphics file/signal, a text data, and/or any other data file ("data file"). Confirmation of receipt of such data file may be indicative that an attendee in such virtual meeting is correctly receiving the data file and that the meeting is being conducted uninterrupted.

The system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

Referring back to FIG. 1, the system 100 may be configured to include one or more attendees, participants, and/or user devices 102 (a, b, c), a server 104, and one or more host device(s) 106. The server 104 may be configured to connect and/or execute one or more online virtual meeting software solutions/platforms that may enable one or more user devices 102 and the host device(s) 106 to communicatively connect with one another using any desired (e.g., wireless, wired, etc.) communications network. The user devices 102 and/or the host devices may be equipped with video, audio, file sharing, user interface (e.g., screen) sharing, etc. hardware and/or software capabilities as well as any other computing and/or processing capabilities.

The host device 106 may be equipped with an ability to determine whether or not any of the attendee user devices 102 are able to receive and/or are receiving (and/or are able to transmit and/or are transmitting) any of the data (e.g., video, audio, text, data, etc.) that may be originating from the host device 102 and/or one or more of the user devices 102. If one of the user devices (e.g., device 102a) is unable to receive/transmit signals, e.g., due to hardware, software, network, etc. issues, the host device 106 may be configured to receive a notification alerting the host device that a particular user is not receiving/transmitting data. After this, the host device 106 may be configured to take an action to attempt to resolve the issue. The actions may include, but are not limited to, restarting the meeting, trying to resolve the issues at the host device's end, inform the device 102a to check, fix, etc. hardware, software, network, etc. issues, and/or perform any other actions.

In some implementations, in an ongoing virtual meeting (and/or prior to and/or during), the host device 106 may be informed whether or not any of the user devices 102 are able to receive host device's data (e.g., audio, video, screens, images, etc.). For example, one or more user interface elements 108, 110 may be displayed on a user interface of the host device 106 indicating whether or not user devices 102 are and/or are not receiving host device's data. The user interface elements 108, 110 may be positioned next to attendee's image corresponding to a particular user device 102. For example, user interface element 108 may be positioned next to an image of the user device 102a (and/or an image of a user using the user device 102a) indicating that the user device 102a is unable to receive host device's data. Conversely, user interface element 110 may be positioned next to an image of the user device 102b (and/or an image of a user using the device 102b). The image may be a livestream, a still image and/or any other image of a user using user device 102. The image may be fed from the user device 102 via the server 104 to the host device 106.

Figure 2:
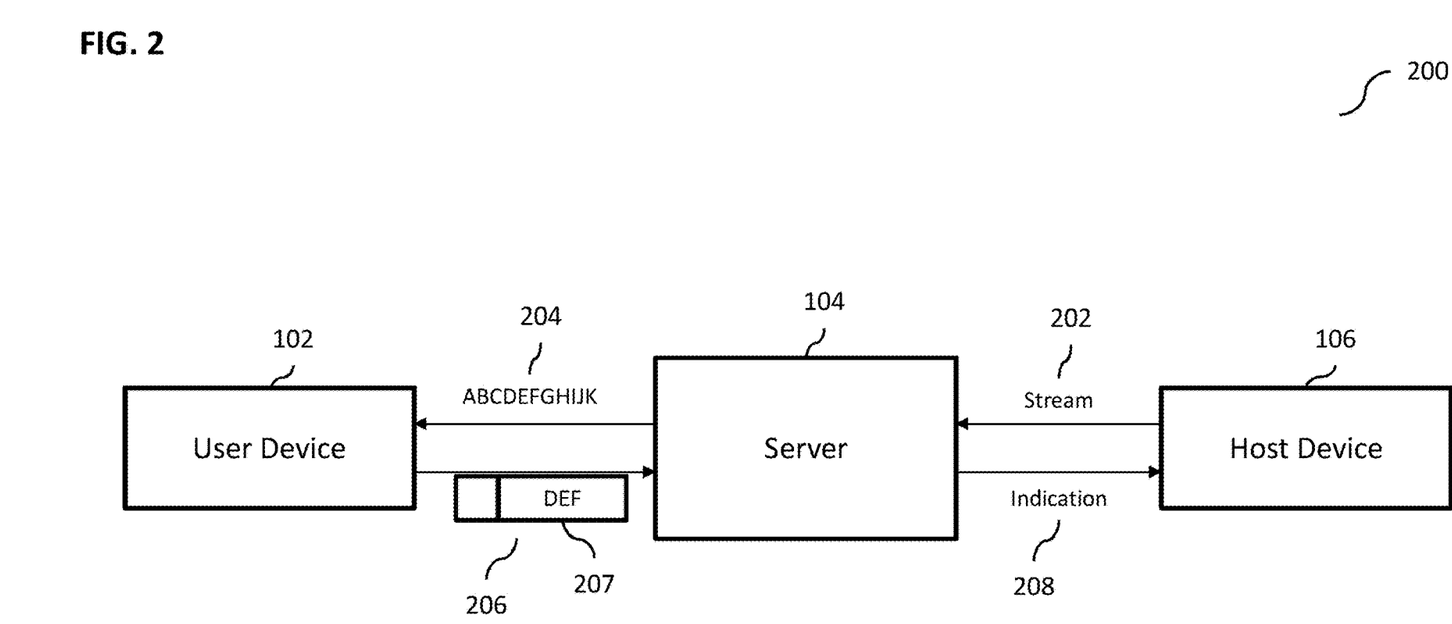
FIG. 2 illustrates an example process for determining whether user devices are receiving data generated by a host device, according to some implementations of the current subject matter.

FIG. 2 illustrates an example process 200 for determining whether user devices are receiving data generated by a host device, according to some implementations of the current subject matter. The process 200 may be performed during a virtual meeting by the system 100 shown in FIG. 1. During such virtual meeting, when the host device 106 starts sharing data (e.g., displayed on a user interface of the host device 106) with one or more user devices 102, the server 104 may be configured to receive a data stream 202 containing data corresponding to the data in the user interface being shared by the host device. The server 104 may then be configured to relay this information in a form of a data stream 204 (e.g., "ABCDEFGHIJK . . . ") to the user device 102. Upon receiving of the data from the server 104, the user device 102 may be configured to generate and transmit an acknowledgement 206 of the received data back to the server 104. The acknowledgement's payload 207 may include a portion of the stream of the data 204 (e.g., "DEF") it just received from the server 104. Any portion of the stream in the payload may be used.

The server 106 may compare the received acknowledgement 206's payload 207 to the data stream 204 that it received from the host device 106 and, if a match is determined, the server 104 may be configured to generate an indication 208 alerting the host device 106 that the user device 102 is able to receive or is receiving host device's data. An icon 110 (as shown in FIG. 1) may be displayed on the host device's user interface. Alternatively, if no match exists between the payload 207 and any portion of the stream 204, the server 104 may generate an indication 208 alerting the host device 106 that the user device 102 is unable to receive host device's data. In this case, an icon 108 (as shown in FIG. 1) may be displayed on the host device's user interface.

Figure 3:
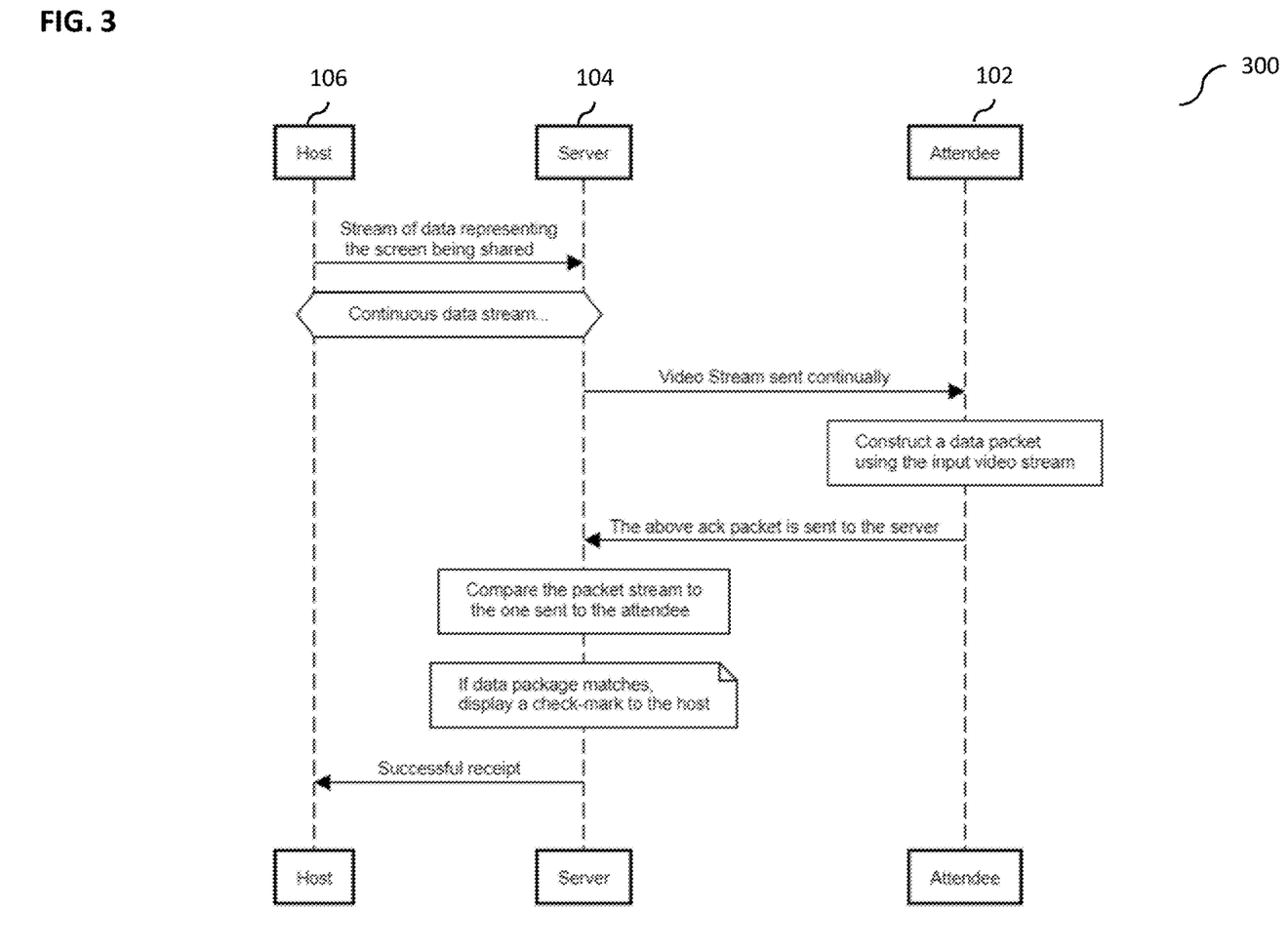
FIG. 3 illustrates an example process for detecting whether data being shared by a host device is received by one or more user devices in a virtual meeting, according to some implementations of the current subject matter.

FIG. 3 illustrates an example process 300 for detecting whether data being shared by a host device is actually received by one or more user devices in a virtual meeting, according to some implementations of the current subject matter. The process 300 may be executed by one or more components of the system 100 shown in FIG. 1. In particular, as shown in FIG. 3, the process 300 may be performed by one or more user devices 102, server 104, and the host device 106.

As shown in FIG. 3, the host device 106 may, in (or during, prior to, etc.) a virtual meeting, initiate transmission of a stream of data representing the user interface of the host device 106 (and/or any other data) to the server 104. The stream of data may be a continuous data stream. The server 104 may then continually transmit the stream of data (e.g., video stream) to the user device 102 (e.g., attendee of the virtual meeting). The user device 102 may extract a portion of the received data stream and generate/construct a data packet or acknowledgement/digest representing the received data stream. The user device 102 may then transmit the generated acknowledgement to the server 104. The server 104 may then compare the acknowledgement to the data stream transmitted to the user device 102. If a match between the acknowledgement and the data stream transmitted to the user device 102 is determined, the server transmits an indication (e.g., an indication of a successful receipt) and an appropriate icon may be displayed on the user interface of the host device 106 (e.g., a check mark, etc.).

If the acknowledgement generated by the user device 102 as received by the server 104 does not match the data that was earlier transmitted to the user device 102 (e.g., the data from the host device (e.g., screen sharing, video, audio, graphics, text, etc.)), the server 104 may return an alert (e.g., a value) to the host device 106 indicating an error (e.g., that the data was not received, was partially received, etc.). An appropriate icon corresponding to that error may be displayed next to the attendee's image on the user interface of the host device 106.

The displayed icon may alert the user of the host device 106 that the data stream transmitted by the host device is being correctly transmitted from the host device 106 but is not being received (or partially received, etc.) at one or more user devices 102. The host device 106 may make a determination that the error may be due to hardware, software, networking issues and/or any other issues associated with the user device 102. Further, the host device 106 may receive an indication of the specific issues that may be encountered by the user device 102 in not being able to correctly receive the host device's data stream. Additionally, the server 104 may be configured to determine a strength of a connection between the server 104 and/or one or more user devices 102. For example, this may be accomplished by transmitting one or more 'hello' data packets, heartbeat messages, etc. to one or more user devices 102. Responses to such packets may be used to ascertain strength of connection. Such packets may be transmitted continuously, periodically, at predetermined periods of time, and/or in any other desired fashion.

In some implementations, the acknowledgement may include a hash of the data transmitted by the server 104 to the user device 102. The server 104 may generate the hash and store it. The user device 102 may be configured to generate the same hash from the received data stream and transmit it back to the server 104. The server 104 may then execute a comparison of two hashes to determine whether a match exists. If match exists, then the server 104 may determine that the data stream was successfully received by the user device 102. If a partial match is determined, the server 102 may determine that connection may still be present. If no match is found (or a hash is not received from the user device 102), the server 104 may determine that the user device 102 did not receive the transmitted data stream. The server 104 may compare the hashes based on hash size, content, and/or any other parameters. The server 104 may also use time of receipt of the hash from the user device 102 to ascertain status of the connection between the user device 102 and the server 104.

In some example implementations, the server 104 may also be configured to account for any data packet loss in the connection between the user device 102 and the server 104 (and/or host device 106). For example, the server 104 may store multiple hashes based on the data transmitted to the user device 102. Similarly, the user device 102 may be configured to generate and transmit multiple hashes to the server 102 based on the data that it received from the server 104. If a predetermined threshold number of hashes (e.g., window size) are received from the user device 102 (e.g., 5 out of 10 stored by the server 104), the server may assume that the user device 102 is receiving the data that the server 104 is transmitting to it. If less than the threshold number of hashes is received, the server 104 may assume that connection has been lost and/or there is an issue with the user device 102 receiving data from the server. The server 104 may be configured to change the predetermined threshold (e.g., window size) based on parameters associated with the connection between the user device and the server. For example, if the connection between the user device and the server needs to have a high reliability (e.g., an online court hearing), the threshold number of received hashes may be very small, e.g., the server needs to receive every hash that it stored from the user device to ensure that connection is uninterrupted. Moreover, the server may also generate additional heartbeat, "hello" messages, etc. to the user device 102 to check the status of the connection.

Figure 4:
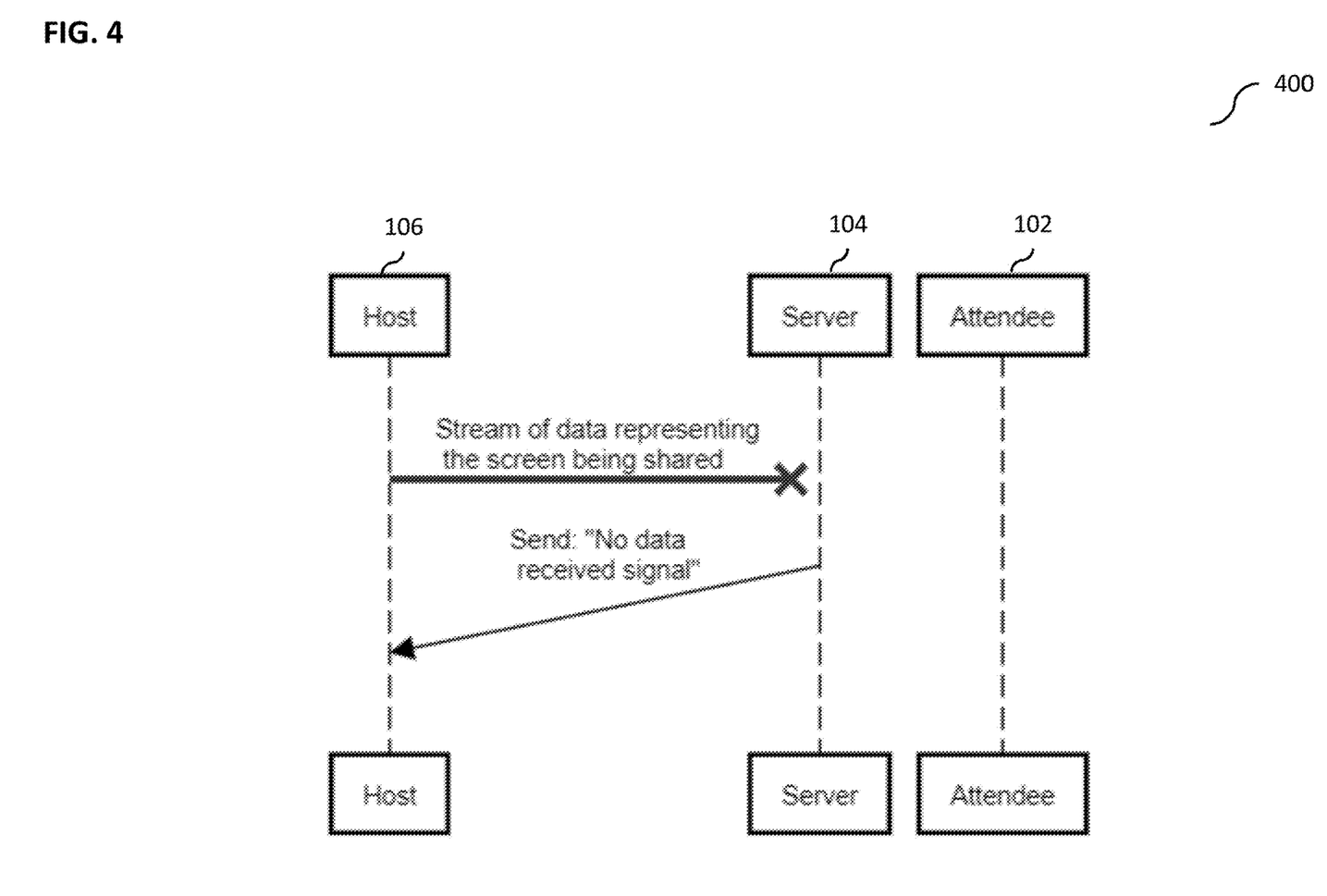
FIG. 4 illustrates an example process for detecting whether data transmitted by the host device is being received by the server in a virtual meeting, according to some implementations of the current subject matter.

FIG. 4 illustrates an example process 400 for detecting whether data transmitted by the host device is being received by the server in a virtual meeting, according to some implementations of the current subject matter. The process 400 may be executed by one or more components of the system 100 shown in FIG. 1. In particular, as shown in FIG. 4, the process 400 may be performed by one or more user devices 102, server 104, and the host device 106.

As shown in FIG. 4, the host device 106 may, in (or during, prior to, etc.) a virtual meeting, initiate transmission of a stream of data representing the user interface of the host device 106 (and/or any other data) to the server 104. The stream of data may be a continuous data stream. However, in this case, the data transmitted by the host device 106 never reaches the server 104 and thus, never reaches the user device 102. The server 104, upon learning that the host device 106 is trying to connect with the server 104, may be configured to generate a message indicating that "no data" is being received by the server 104 and transmit the generated message to the host device 106. An appropriate icon (similar to the icon 108) may be displayed on the user interface of the host device 106 indicating that no connection with the server 104 is present.

To determine whether the host device 106 can connect with the server 104 and/or assess strength of a signal between the host device 106 and the server 104, the server 104 may be configured to generate and transmit one or more 'hello' packet message, heartbeat messages, and/or other message to the host device 106. Upon receiving a response, the server 104 may be configured to determine strength of the signal (e.g., based on a time that it took the host device 106 to return a response to the server 104).

Once the host device 106 has received the "No data received" message from the server 104, the virtual meeting software running on the host device 106 may be configured to display an error stating that the server 104 did not receive any data from the host device 106. This may prompt the user of host device 106 to investigate the cause of the error (e.g., meeting software error, hardware error, network error, administrative settings preventing sharing of data, etc.) and attempt to resolve the error.

Figure 5:
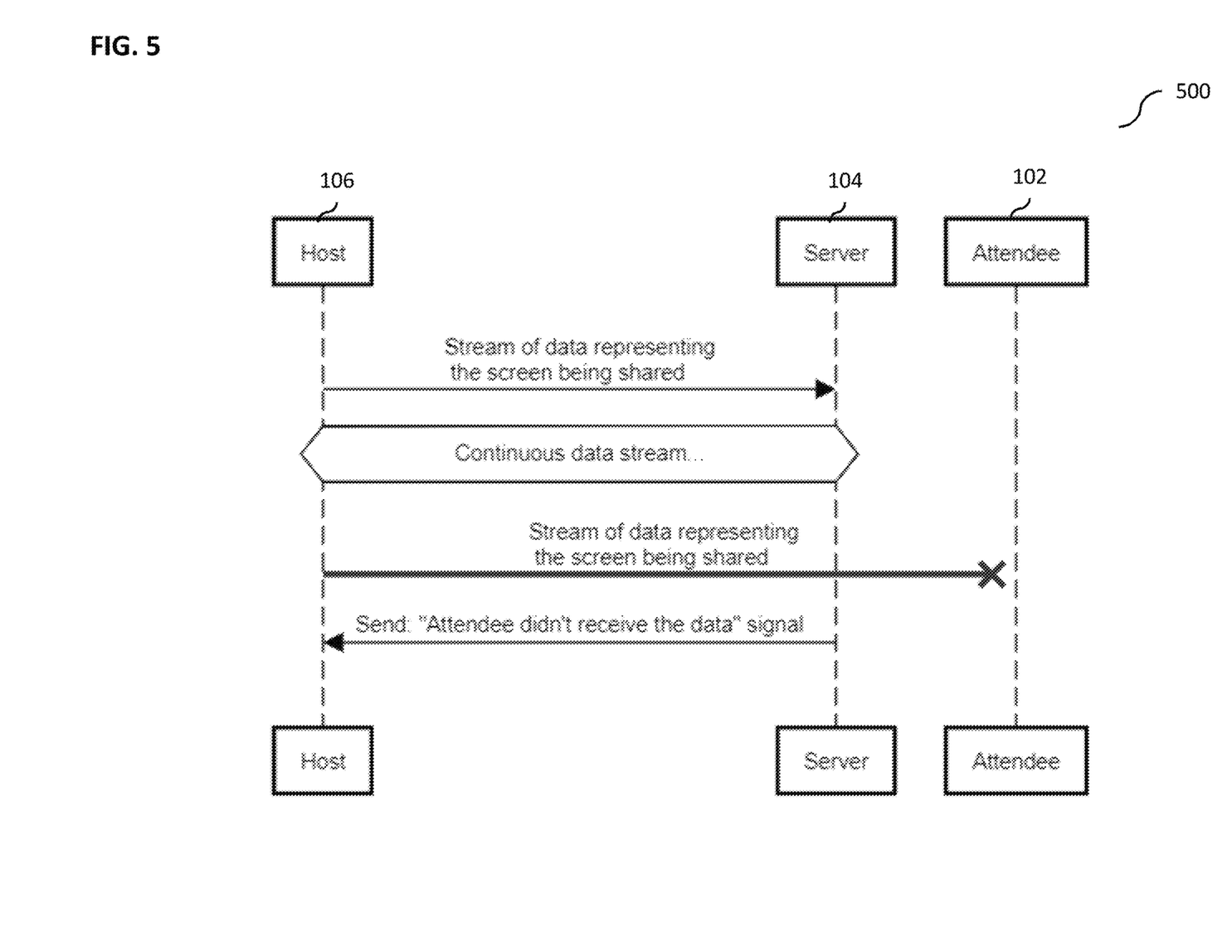
FIG. 5 illustrates an example process for detecting whether data transmitted by the host device is being received by the user device (e.g., attendee's device) in a virtual meeting, according to some implementations of the current subject matter.

FIG. 5 illustrates an example process 500 for detecting whether data transmitted by the host device is being received by the user device (e.g., attendee's device) in a virtual meeting, according to some implementations of the current subject matter. The process 500, similar to processes 300 and 400 shown in FIGS. 3 and 4, respectively, may be executed by one or more components of the system 100 shown in FIG. 1. In particular, as shown in FIG. 5, the process 500 may be performed by one or more user devices 102, server 104, and the host device 106.

As shown in FIG. 5, the host device 106 may, in (or during, prior to, etc.) a virtual meeting, initiate transmission of a stream of data representing the user interface of the host device 106 (and/or any other data) to the server 104. The stream of data may be a continuous data stream. The server 104 may then attempt to transmit the stream of data (e.g., video stream) to the user device 102 (e.g., attendee of the virtual meeting). However, here, the user device 102 is unable to receive the data stream from the server 104. This means that the server 104 will not be able to receive an acknowledgement (as discussed in connection with FIG. 3 above). In some implementations, the server 104 may be configured to wait for such acknowledgement from the user device 102 for a predetermined period of time after transmitting the data stream to the user device 102. The predetermined period of time may be measured by the server 104 using its internal clock that may be configured to start as soon as transmission of the data stream is initiated to the host device 106 from the server 104. One or more clocks may be started at different intervals during the virtual meeting to determine whether or not there is receipt of data by the user device 102. If after expiration of the predetermined period of time, the server 104 does not receive any response (e.g., acknowledgement) from the user device 102, the server 104 may be configured to generate and transmit a message to the host device 106 indicating that the user device did not receive the data (e.g., "attendee didn't receive the data" message). The user interface of the host device 106 may be configured to display an icon (e.g., icon 108 as shown in FIG. 1) next to an image of the user of the user device 102 that did not receive host device's data.

In some example implementations, the user interface of the host device 106 may be configured to display connection status for each attendee of the virtual meeting (e.g., using icons 108, 110 as shown in FIG. 1). This can allow the user using the host device 106 to determine which of the attendees in the virtual meeting are able to see the screen being shared by the user of the host device at all times. The user of the host device may be informed at all times which attendees are/were able to consume the data being shared. Further, the user of the host device may also be informed whether any lack of connection issues are present at the respective attendees' end and/or whether it is a connection issue between the host device and the server, and/or any other hardware, software, and/or network issue. If attendees are not able to receive data transmitted by the host device, the host device may be configured to terminate and restart the virtual meeting, wait for connection to resume, continue the virtual meeting without a particular attendee that may be having connection issues, and/or perform any other actions.

Figure 6:
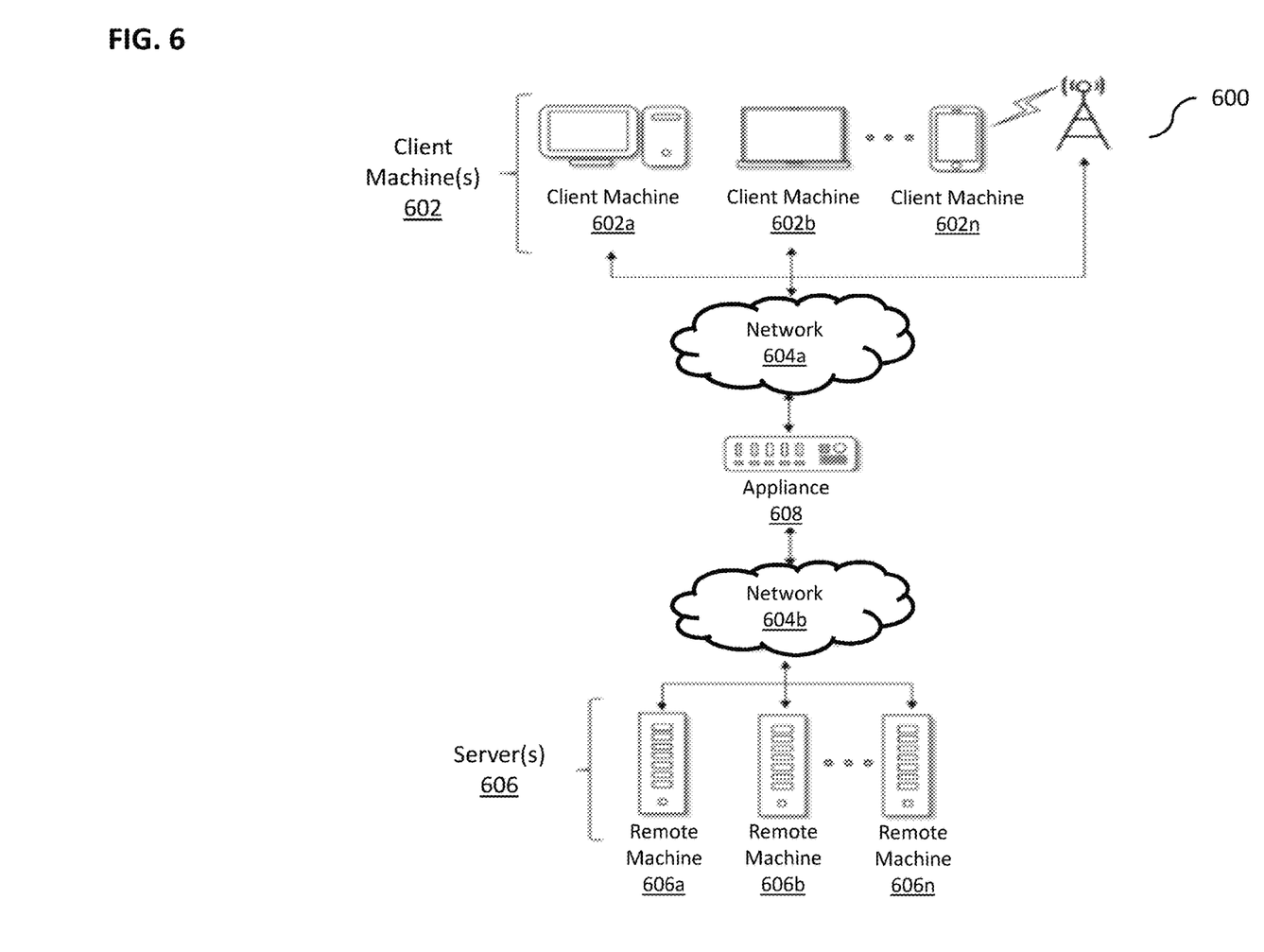
FIG. 6 illustrates an example of a network environment, according to some implementations of the current subject matter

FIG. 6 illustrates an example of a network environment 600, according to some implementations of the current subject matter. Referring to FIGS. 1-6, the network environment 600, in which various aspects of the disclosure may be implemented, may include one or more clients 602a-602n, one or more remote machines 606a-606n, one or more networks 604a and 604b, and one or more appliances 608 installed within the network environment 600. The clients 602a-602n communicate with the remote machines 606a-606n via the networks 604a and 604b.

In some example implementations, the clients 602a-602n may communicate with the remote machines 606a-606n via an appliance 608. The illustrated appliance 608 is positioned between the networks 604a and 604b, and may also be referred to as a network interface or gateway. In some example implementations, the appliance 608 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example implementations, multiple appliances 608 may be used, and the appliance(s) 608 may be deployed as part of the network 604a and/or 604b.

The clients 602a-602n may be generally referred to as client machines, local machines, clients, client nodes, client computers, client devices, computing devices, endpoints, or endpoint nodes. One or more of the clients 602a-602n may implement, for example, the client device 130 and/or the like. The remote machines 606a-606n may be generally referred to as servers or a server farm. In some example implementations, a client 602 may have the capacity to function as both a client node seeking access to resources provided by a server 606 and as a server 606 providing access to hosted resources for other clients 602a-602n. The networks 604a and 604b may be generally referred to as a network 604. The network 604 including the networks 604a and 604b may be configured in any combination of wired and wireless networks.

The servers 606 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory;

a cloud server; or a server executing an application acceleration program that provides firewall functionality, application functionality, or load balancing functionality.

A server 606 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example implementations, a server 606 may execute a remote presentation services program or other program that uses a thin-client or a remote-display protocol to capture display output generated by an application executing on a server 606 and transmit the application display output to a client 602.

In yet other example implementations, a server 606 may execute a virtual machine, such as the first virtual machine and/or the second virtual machine, to provide, for example, to the user at a client device, access to a computing environment such as the virtual desktop. The virtual machine may be managed by, for example, a hypervisor (e.g., a first hypervisor, a second hypervisor, and/or the like), a virtual machine manager (VMM), or any other hardware virtualization technique within the server 606.

In some example implementations, the network 604 may be a local-area network (LAN), a metropolitan area network (MAN), a wide area network (WAN), a primary public network, and/or a primary private network. Additional implementations may include one or more mobile telephone networks that use various protocols to communicate among mobile devices. For short-range communications within a wireless local-area network (WLAN), the protocols may include 802.11, Bluetooth, and Near Field Communication (NFC).

Figure 7:
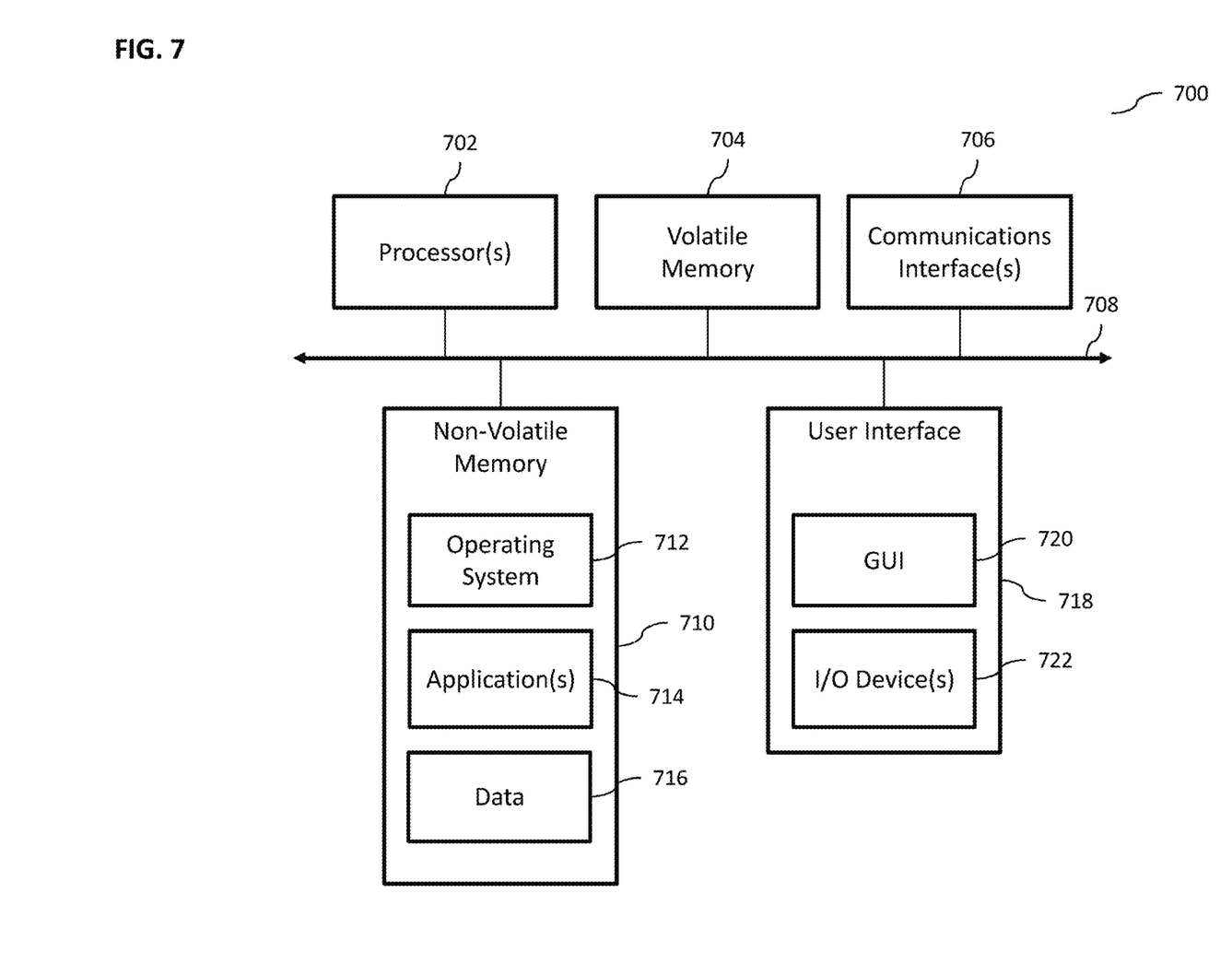
FIG. 7 depicts a block diagram illustrating an example of a computing device, according to some implementations of the current subject matter.

FIG. 7 depicts a block diagram illustrating an example of a computing device 700, in accordance with some example implementations. Referring to FIGS. 1-7, the computing device 700 may be useful for practicing an implementation of the system 100 and analysis engine 120.

As shown in FIG. 7, the computing device 700 may include one or more processors 702, volatile memory 704 (e.g., RAM), non-volatile memory 710 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 718, one or more communications interfaces 706, and a communication bus 708. The user interface 718 may include a graphical user interface (GUI) 720 (e.g., a touchscreen, a display, and/or the like) and one or more input/output (I/O) devices 722 (e.g., a mouse, a keyboard, and/or the like). The non-volatile memory 710 may store an operating system 712, one or more applications 714, and data 716 such that computer instructions of the operating system 712 and/or applications 714 are executed by the processor(s) 702 out of the volatile memory 704. Data may be entered using an input device of the GUI 720 or received from I/O device(s) 722. Various elements of the computing device 700 may communicate via communication the communication bus 708. The computing device 700 as shown in FIG. 7 is shown merely as an example, as the resource controller 150 and the client device 130 may be implemented by any computing or processing environment and with any type of machine or set of machines that may have suitable hardware and/or software capable of operating as described herein.

The processor(s) 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example implementations, the "processor" may be one or more physical processors or one or more "virtual" (e.g., remotely located or "cloud") processors.

The communications interfaces 706 may include one or more interfaces to enable the computing device 700 to access a computer network such as a local area network (LAN), a wide area network (WAN), a public land mobile network (PLMN), and/or the Internet through a variety of wired and/or wireless or cellular connections.

As noted above, in some example implementations, one or more computing devices 700 may execute an application on behalf of a user of a client computing device (e.g., clients 602), may execute a virtual machine, which provides an execution session within which applications execute on behalf of a user or a client computing device (e.g., clients 602), such as a hosted desktop session (e.g., a virtual desktop), may execute a terminal services session to provide a hosted desktop environment, or may provide access to a computing environment including one or more of: one or more applications, one or more desktop applications, and one or more desktop sessions in which one or more applications may execute.

Figure 8:
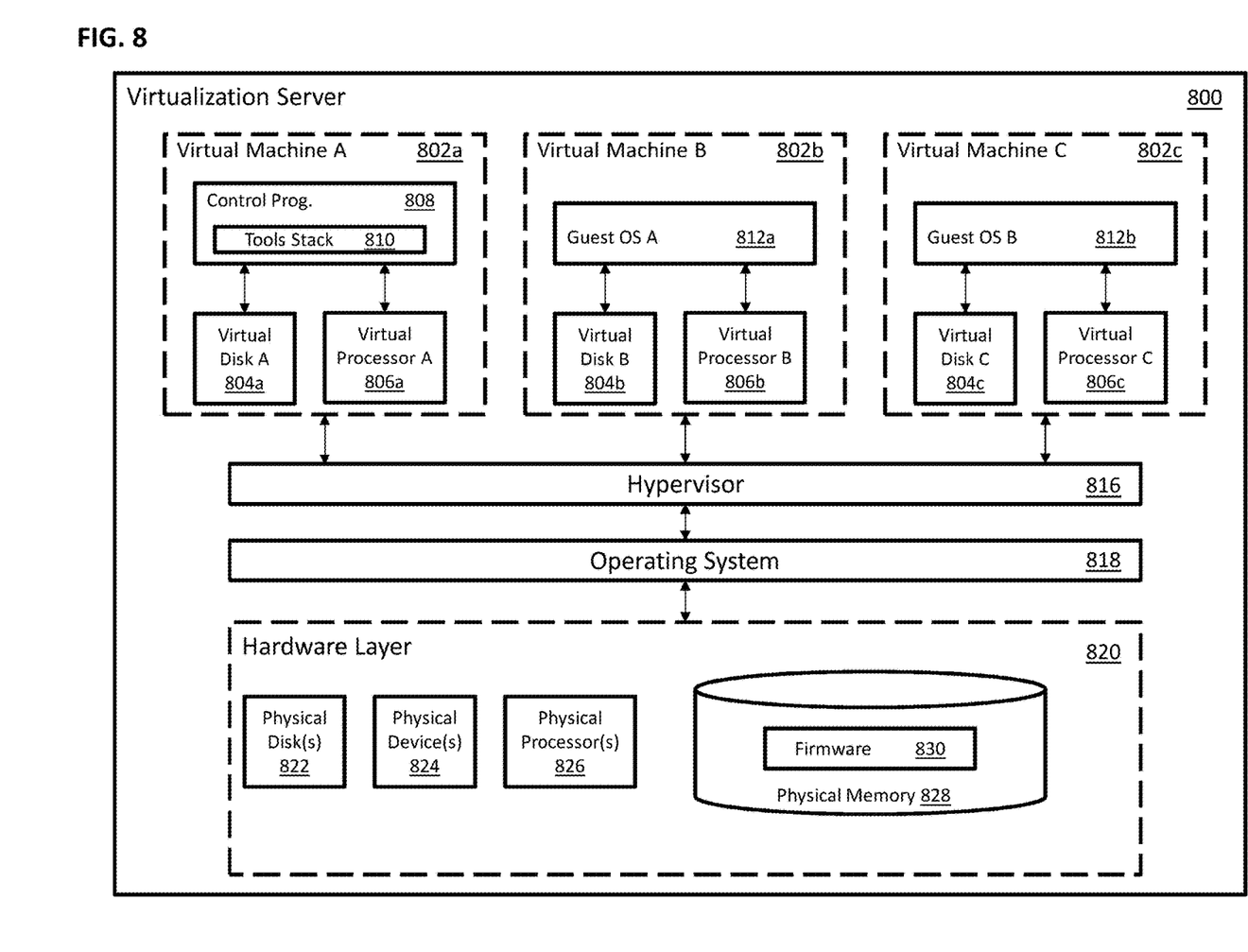
FIG. 8 illustrates a high-level architecture of an example of a virtualization system for implementing the computing system shown in FIG. 1, according to some implementations of the current subject matter.

FIG. 8 illustrates a high-level architecture of an example of a virtualization system for implementing the computing system 100, in accordance with some example implementations. As shown in FIG. 8, the virtualization system may be a single-server or multi-server system, or a cloud system, including at least one virtualization server 800 configured to provide virtual desktops and/or virtual applications to one or more client access devices 602a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 800 may be configured as a virtualization server in a virtualization environment, for example, a single-server, multi-server, or cloud computing environment. Virtualization server 800 illustrated in FIG. 8 may be deployed as and/or implemented by one or more implementations of server 606 illustrated in FIG. 6 or by other known computing devices. Included in virtualization server 800 is hardware layer 820 that may include one or more physical disks 822, one or more physical devices 824, one or more physical processors 826, and one or more physical memories 828. In some implementations, firmware 830 may be stored within a memory element in physical memory 828 and be executed by one or more of physical processors 826. Virtualization server 800 may further include operating system 818 that may be stored in a memory element in physical memory 828 and executed by one or more of physical processors 826. Still further, hypervisor 816 may be stored in a memory element in physical memory 828 and be executed by one or more of physical processors 826. Presence of operating system 818 may be optional.

Executing on one or more of physical processors 826 may be one or more virtual machines 802A-C (generally, 802). Each virtual machine 802 may have virtual disk 804A-C and virtual processor 806A-C. In some implementations, first virtual machine 802A may execute, using virtual processor 806A, control program 808 that includes tools stack 810. Control program 808 may be referred to as a control virtual machine, Domain 0, Dom0, or other virtual machine used for system administration and/or control. In some implementations, one or more virtual machines 802B-C may execute, using virtual processor 806B-C, guest operating system 812A-B (generally, 812).

Physical devices 824 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 800. Physical memory 828 in hardware layer 820 may include any type of memory. Physical memory 828 may store data, and in some implementations may store one or more programs, or set of executable instructions. FIG. 8 illustrates an implementation where firmware 830 is stored within physical memory 828 of virtualization server 800. Programs or executable instructions stored in physical memory 828 may be executed by the one or more processors 826 of virtualization server 800.

Virtualization server 800 may also include hypervisor 816. In some implementations, hypervisor 816 may be a program executed by processors 826 on virtualization server 800 to create and manage any number of virtual machines 802. Hypervisor 816 may be referred to as a virtual machine monitor, or platform virtualization software. In some implementations, hypervisor 816 may be any combination of executable instructions and hardware that monitors virtual machines 802 executing on a computing machine. Hypervisor 816 may be a Type 2 hypervisor, where the hypervisor executes within operating system 818 executing on virtualization server 800. Virtual machines may then execute at a layer above hypervisor 816. In some implementations, the Type 2 hypervisor may execute within the context of a user's operating system such that the Type 2 hypervisor interacts with the user's operating system. In other implementations, one or more virtualization servers 800 in a virtualization environment may instead include a Type 1 hypervisor (not shown). A Type 1 hypervisor may execute on virtualization server 800 by directly accessing the hardware and resources within hardware layer 820. That is, while Type 2 hypervisor 816 accesses system resources through host operating system 818, as shown, a Type 1 hypervisor may directly access all system resources without host operating system 818. A Type 1 hypervisor may execute directly on one or more physical processors 826 of virtualization server 800, and may include program data stored in physical memory 828.

Hypervisor 816, in some implementations, may provide virtual resources to guest operating systems 812 or control programs 808 executing on virtual machines 802 in any manner that simulates operating systems 812 or control programs 808 having direct access to system resources. System resources can include, but are not limited to, physical devices 824, physical disks 822, physical processors 826, physical memory 828, and any other component included in hardware layer 820 of virtualization server 800. Hypervisor 816 may be used to emulate virtual hardware, partition physical hardware, virtualize physical hardware, and/or execute virtual machines that provide access to computing environments. In still other implementations, hypervisor 816 may control processor scheduling and memory partitioning for virtual machine 802 executing on virtualization server 800. Examples of hypervisor 816 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 800 may execute hypervisor 816 that creates a virtual machine platform on which guest operating systems 812 may execute. When this is the case, virtualization server 800 may be referred to as a host server. An example of such a virtualization server is Citrix Hypervisor® provided by Citrix Systems, Inc., of Fort Lauderdale, Fla.

Hypervisor 816 may create one or more virtual machines 802B-C (generally, 802) in which guest operating systems 812 execute. In some implementations, hypervisor 816 may load a virtual machine image to create virtual machine 802. The virtual machine image may refer to a collection of data, states, instructions, etc. that make up an instance of a virtual machine. In other implementations, hypervisor 816 may execute guest operating system 812 within virtual machine 802. In still other implementations, virtual machine 802 may execute guest operating system 812.

In addition to creating virtual machines 802, hypervisor 816 may control the execution of at least one virtual machine 802. The hypervisor 816 may present at least one virtual machine 802 with an abstraction of at least one hardware resource provided by virtualization server 800 (e.g., any hardware resource available within hardware layer 820). In some implementations, hypervisor 816 may control the manner in which virtual machines 802 access physical processors 826 available in virtualization server 800. Controlling access to physical processors 826 may include determining whether virtual machine 802 should have access to processor 826, and how physical processor capabilities are presented to virtual machine 802.

As shown in FIG. 8, the virtualization server 800 may host or execute one or more virtual machines 802. Virtual machine 802 may be a set of executable instructions and/or user data that, when executed by processor 826, may imitate the operation of a physical computer such that virtual machine 802 can execute programs and processes much like a physical computing device. While FIG. 8 illustrates an implementation where virtualization server 800 hosts three virtual machines 802, in other implementations virtualization server 800 may host any number of virtual machines 802. Hypervisor 816 may provide each virtual machine 802 with a unique virtual view of the physical hardware, including memory 828, processor 826, and other system resources 822, 824 available to that virtual machine 802. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 816 may create one or more unsecure virtual machines 802 and one or more secure virtual machines 802. Unsecure virtual machines 802 may be prevented from accessing resources, hardware, memory locations, and programs that secure virtual machines 802 may be permitted to access. In other implementations, hypervisor 816 may provide each virtual machine 802 with a substantially similar virtual view of the physical hardware, memory, processor, and other system resources available to virtual machines 802.

Each virtual machine 802 may include virtual disk 804A-C (generally 804) and virtual processor 806A-C (generally 806.) Virtual disk 804 may be a virtualized view of one or more physical disks 822 of virtualization server 800, or a portion of one or more physical disks 822 of virtualization server 800. The virtualized view of physical disks 822 may be generated, provided, and managed by hypervisor 816. In some implementations, hypervisor 816 may provide each virtual machine 802 with a unique view of physical disks 822. These particular virtual disk 804 (included in each virtual machine 802) may be unique, when compared with other virtual disks 804.

Virtual processor 806 may be a virtualized view of one or more physical processors 826 of virtualization server 800. The virtualized view of physical processors 826 may be generated, provided, and managed by hypervisor 816. Virtual processor 806 may have substantially all of the same characteristics of at least one physical processor 826. Virtual processor 826 may provide a modified view of physical processors 826 such that at least some of the characteristics of virtual processor 806 are different from the characteristics of the corresponding physical processor 826.

Figure 9:
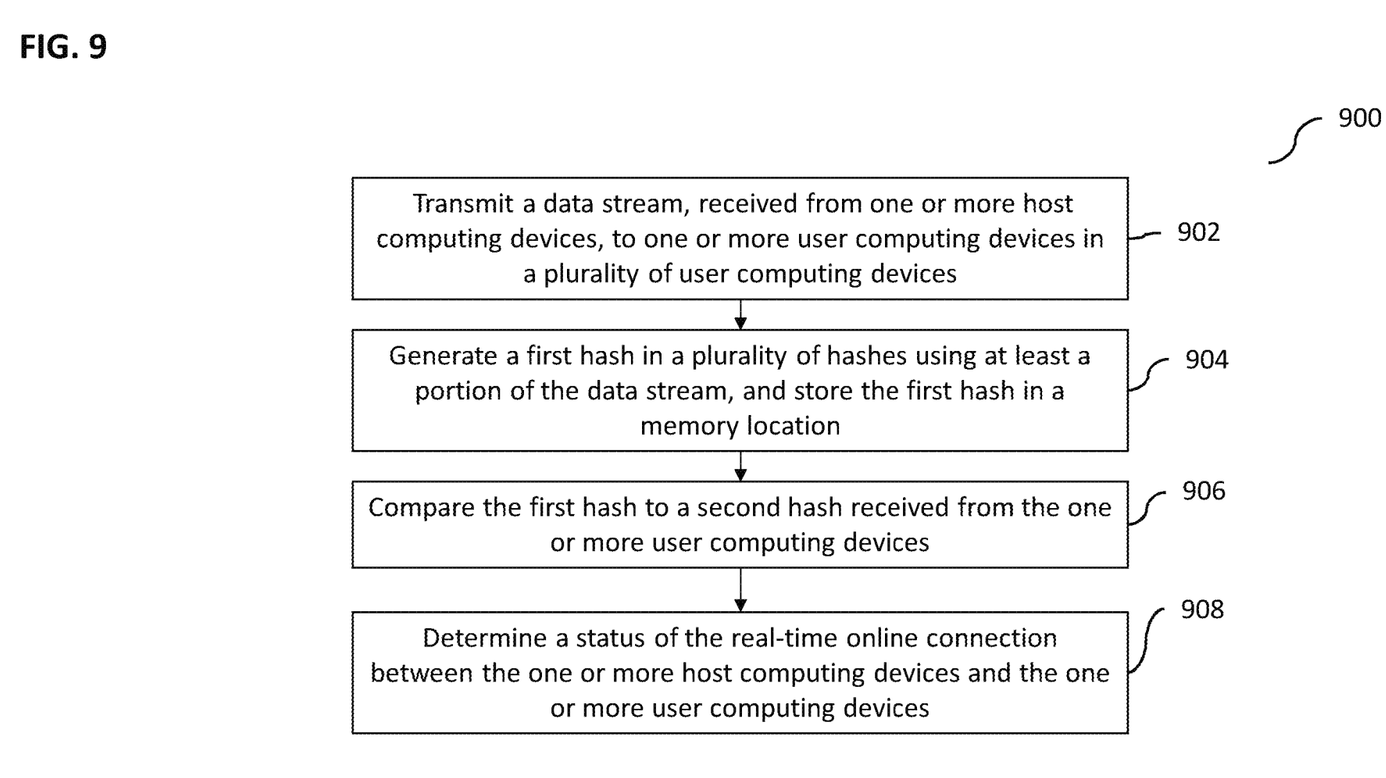
FIG. 9 illustrates an example of a method, according to some implementations of the current subject matter.

FIG. 9 illustrates an example of a method 900 for determining whether signals are received by one or more devices in a virtual meeting, according to some implementations of the current subject matter. The method 900 may be performed by the system 100 shown in FIG. 1. The system 100 may include the server 104, one or more host computing device 106, and one or more user computing devices 102. At 902, a data stream received from one or more host computing devices may be transmitted by the server 104 to one or more user computing devices in a plurality of user computing devices. The host computing devices and user computing devices may be communicatively coupled using a real-time online connection (e.g., a virtual online meeting).

At 904, a first hash in a plurality of hashes may be generated by the server using at least a portion of the data stream. The first hash may be stored in a memory location of the server.

At 906, the server 104 may compare the first hash to a second hash received from one or more user computing devices. The second hash may be generated by the user computing devices upon receipt of the transmitted data stream.

At 908, the server 104 may determine, based on the comparison, a status of the real-time online connection between the host computing devices and the user computing devices.

In some implementations, the current subject matter can include one or more of the following optional features. The method 900 may further include displaying, at a user interface of the one or more host computing devices, an indication of the status of the real-time online connection (as shown in FIG. 1). The indication of the status of the real-time online connection may include at least one of the following: the one or more host computing devices are communicatively coupled to the one or more user devices, the one or more user computing devices are unable to receive the transmitted data stream, the data stream is not being transmitted from the host device, and any combination thereof.

In some implementations, the data stream may include at least one of the following: a video data, an audio data, a text data, a graphics data, and any combination thereof.

In some implementations, transmission of the data stream may include determining whether the data stream was received from the one or more host computing devices. Upon failing to detect a receipt of the data stream from the host computing devices, the server 104 may generate and transmit to the host computing devices, a message indicating failure to receive the data stream from the one or more host computing devices. The message may be displayed at a user interface of the host computing devices. Upon receiving the data stream from the host computing devices, the server 104 may transmit the data stream to the user computing devices.

In some implementations, the comparison of hashes may include determining whether the second hash was received from the user computing devices. Upon failing to detect a receipt of the second hash from the user computing devices, the server 104 may generate and transmit to the host computing devices, a message indicating failure by the user computing devices to receive the data stream from the host computing devices. The message may be displayed at a user interface of the host computing devices. Upon receiving the second hash from the user computing devices, the server 104 may perform the comparing of the hashes.

In some implementations, the server 104 may generate and store a plurality of first hashes and compare them to a plurality of corresponding received second hashes. The status of the real-time online connection may be determined based on a number of first hashes in the plurality of first hashes matching a number of second hashes in the plurality of second hashes.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
  detecting a failure to receive a data stream from one or more host computing devices in a plurality of user computing devices;
  transmitting, to the one or more host computing devices, a message indicating the failure to receive the data stream from the one or more host computing devices, the message being displayed at a user interface of the one or more host computing device;
  receiving, from the one or more host computing devices, the data stream;
  transmitting, to one or more user computing devices, the received data stream, the one or more host computing devices and the one or more user computing devices being communicatively coupled using a real-time online connection;
  generating a first hash in a plurality of hashes using at least a portion of the data stream;
  storing the first hash in a memory location;
  comparing the first hash to a second hash received from the one or more user computing devices, the second hash being generated by the one or more user computing devices upon receipt of the data stream; and determining, based on the comparing, a status of the real-time online connection between the one or more host computing devices and the one or more user computing devices, the status of the real-time online connection indicating a visibility of the at least the portion of the data stream on the one or more user computing devices.

2. The computer-implemented method of claim 1, further comprising displaying, at a user interface of the one or more host computing devices, an indication of the status of the real-time online connection.

3. The computer-implemented method of claim 2, wherein the indication of the status of the real-time online connection comprises at least one of the one or more host computing devices are communicatively coupled to the one or more user computing devices, the one or more user computing devices are unable to receive the data stream, the data stream is not being transmitted from the one or more host computing devices, and any combination thereof.

4. The computer-implemented method of claim 1, wherein the data stream comprises at least one of: a video data, an audio data, a text data, a graphics data, and any combination thereof.

5. The computer-implemented method of claim 1, wherein comparing comprises:
   determining whether the second hash was received from the one or more user computing devices, wherein
      upon failing to detect a receipt of the second hash from the one or more user computing devices, generating and transmitting, to the one or more host computing devices, a message indicating failure by the one or more user computing devices to receive the data stream from the one or more host computing devices, the message being displayed at a user interface of the one or more host computing devices; and
      upon receiving the second hash from the one or more user computing devices, performing the comparing.

6. The computer-implemented method of claim 1, wherein determining the status of the real-time online connection is determined based on the first hash in the plurality of hashes matching the second hash.

7. A system comprising:
   at least one programmable processor; and
   a non-transitory machine-readable medium storing instructions that, when executed by the at least one programmable processor, cause the at least one programmable processor to perform operations comprising:
      detecting a failure to receive a data stream from one or more host computing devices in a plurality of user computing devices;
      transmitting, to the one or more host computing devices, a message indicating the failure to receive the data stream from the one or more host computing devices, the message being displayed at a user interface of the one or more host computing device;
      receiving, from the one or more host computing devices, the data stream;
      transmitting, to one or more user computing devices, the received data stream, the one or more host computing devices and the one or more user computing devices being communicatively coupled using a real-time online connection;
      generating a first hash in a plurality of hashes using at least a portion of the data stream;
      storing the first hash in a memory location;
      comparing the first hash to a second hash received from the one or more user computing devices, the second hash being generated by the one or more user computing devices upon receipt of the data stream; and
      determining, based on the comparing, a status of the real-time online connection between the one or more host computing devices and the one or more user computing devices, the status of the real-time online connection indicating a visibility of the at least the portion of the data stream on the one or more user computing devices.

8. The system of claim 7, wherein the operations further comprise displaying, at a user interface of the one or more host computing devices, an indication of the status of the real-time online connection.

9. The system of claim 8, wherein the indication of the status of the real-time online connection comprises at least one of: the one or more host computing devices are communicatively coupled to the one or more user computing devices, the one or more user computing devices are unable to receive the data stream, the data stream is not being transmitted from the one or more host computing devices, and any combination thereof.

10. The system of claim 7, wherein the data stream comprises at least one of: a video data, an audio data, a text data, a graphics data, and any combination thereof.

11. The system of claim 7, wherein comparing comprises:
    determining whether the second hash was received from the one or more user computing devices, wherein
       upon failing to detect a receipt of the second hash from the one or more user computing devices, generating and transmitting, to the one or more host computing devices, a message indicating failure by the one or more user computing devices to receive the data stream from the one or more host computing devices, the message being displayed at a user interface of the one or more host computing devices; and
       upon receiving the second hash from the one or more user computing devices, performing the comparing.

12. The system of claim 1, wherein determining the status of the real-time online connection is determined based on the first hash in the plurality of hashes matching the second hash.

13. A computer program product comprising a non-transitory machine-readable medium storing instructions that, when executed by at least one programmable processor, cause the at least one programmable processor to perform operations comprising:
    detecting a failure to receive a data stream from one or more host computing devices in a plurality of user computing devices;
    transmitting, to the one or more host computing devices, a message indicating the failure to receive the data stream from the one or more host computing devices, the message being displayed at a user interface of the one or more host computing device
    receiving, from the one or more host computing devices, the data stream;
    transmitting, to one or more user computing devices, the received data stream, the one or more host computing devices and the one or more user computing devices being communicatively coupled using a real-time online connection;
    generating a first hash in a plurality of hashes using at least a portion of the data stream;
    storing the first hash in a memory location;

comparing the first hash to a second hash received from the one or more user computing devices, the second hash being generated by the one or more user computing devices upon receipt of the data stream; and determining, based on the comparing, a status of the real-time online connection between the one or more host computing devices and the one or more user computing devices, the status of the real-time online connection indicating a visibility of the at least the portion of the data stream on the one or more user computing devices.

14. The computer program product of claim 13, wherein the operations further comprise displaying, at a user interface of the one or more host computing devices, an indication of the status of the real-time online connection.

15. The computer program product of claim 14, wherein the indication of the status of the real-time online connection comprises at least one of: the one or more host computing devices are communicatively coupled to the one or more user computing devices, the one or more user computing devices are unable to receive the data stream, the data stream is not being transmitted from the one or more host computing devices, and any combination thereof.

16. The computer program product of claim 13, wherein the data stream comprises at least one of: a video data, an audio data, a text data, a graphics data, and any combination thereof.

* * * * *